(12) United States Patent
Unger et al.

(10) Patent No.: US 8,874,593 B2
(45) Date of Patent: *Oct. 28, 2014

(54) TESTING DATA SILO

(75) Inventors: Richard Unger, Seattle, WA (US); Simon Wong, San Carlos, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/277,905

(22) Filed: Oct. 20, 2011

(65) Prior Publication Data

US 2013/0007523 A1 Jan. 3, 2013

Related U.S. Application Data

(60) Provisional application No. 61/503,754, filed on Jul. 1, 2011.

(51) Int. Cl.
*G06F 7/00* (2006.01)
*G06F 17/00* (2006.01)
*G06F 17/30* (2006.01)
*G06F 11/36* (2006.01)

(52) U.S. Cl.
CPC .............................. *G06F 11/3672* (2013.01); *G06F 11/3664* (2013.01)
USPC .......................... 707/754; 707/758; 707/704

(58) Field of Classification Search
USPC .................... 707/755, 635, 772, 793; 700/83
See application file for complete search history.

(56) References Cited

U.S. PATENT DOCUMENTS

| | | | |
|---|---|---|---|
| 5,577,188 | A | 11/1996 | Zhu |
| 5,608,872 | A | 3/1997 | Schwartz et al. |
| 5,649,104 | A | 7/1997 | Carleton et al. |
| 5,715,450 | A | 2/1998 | Ambrose et al. |
| 5,761,419 | A | 6/1998 | Schwartz et al. |
| 5,819,038 | A | 10/1998 | Carleton et al. |
| 5,821,937 | A | 10/1998 | Tonelli et al. |
| 5,831,610 | A | 11/1998 | Tonelli et al. |
| 5,873,096 | A | 2/1999 | Lim et al. |
| 5,918,159 | A | 6/1999 | Fomukong et al. |
| 5,963,953 | A | 10/1999 | Cram et al. |
| 6,092,083 | A | 7/2000 | Brodersen et al. |
| 6,169,534 | B1 | 1/2001 | Raffel et al. |
| 6,178,425 | B1 | 1/2001 | Brodersen et al. |
| 6,189,011 | B1 | 2/2001 | Lim et al. |
| 6,216,135 | B1 | 4/2001 | Brodersen et al. |
| 6,233,617 | B1 | 5/2001 | Rothwein et al. |
| 6,266,669 | B1 | 7/2001 | Brodersen et al. |
| 6,295,530 | B1 | 9/2001 | Ritchie et al. |
| 6,324,568 | B1 | 11/2001 | Diec |
| 6,324,693 | B1 | 11/2001 | Brodersen et al. |

(Continued)

*Primary Examiner* — Susan Chen
(74) *Attorney, Agent, or Firm* — Blakely, Sokoloff, Taylor & Zafman

(57) ABSTRACT

In accordance with disclosed embodiments, there are provided methods, systems, and apparatuses for creating a data silo and testing with a data silo including, for example, initiating a test sequence against a production database within a host organization, wherein the test sequence specifies: (a) new data for insertion into the production database during the test sequence and (b) one or more queries for execution against the production database during the test sequence. Such a method further includes inserting the new data into the production database; recording one or more row IDs corresponding to the inserted new data; injecting a test context filter into the one or more queries based on the one or more row IDs; and executing the one or more queries against the production database.

21 Claims, 6 Drawing Sheets

(56) References Cited

U.S. PATENT DOCUMENTS

| | | | |
|---|---|---|---|
| 6,336,137 B1 | 1/2002 | Lee et al. | |
| D454,139 S | 3/2002 | Feldcamp | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu et al. | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier et al. | |
| 6,654,032 B1 | 11/2003 | Zhu et al. | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu et al. | |
| 6,768,904 B2 | 7/2004 | Kim | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker et al. | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 7,340,411 B2 | 3/2008 | Cook | |
| 7,620,655 B2 | 11/2009 | Larsson et al. | |
| 7,676,288 B2 * | 3/2010 | Middleton, Jr. | 700/83 |
| 8,145,651 B2 * | 3/2012 | Weissman | 707/755 |
| 2001/0044791 A1 | 11/2001 | Richter et al. | |
| 2002/0022986 A1 | 2/2002 | Coker et al. | |
| 2002/0029161 A1 | 3/2002 | Brodersen et al. | |
| 2002/0029376 A1 | 3/2002 | Ambrose et al. | |
| 2002/0035577 A1 | 3/2002 | Brodersen et al. | |
| 2002/0042264 A1 | 4/2002 | Kim | |
| 2002/0042843 A1 | 4/2002 | Diec | |
| 2002/0072951 A1 | 6/2002 | Lee et al. | |
| 2002/0082892 A1 | 6/2002 | Raffel et al. | |
| 2002/0129352 A1 | 9/2002 | Brodersen et al. | |
| 2002/0140731 A1 | 10/2002 | Subramaniam et al. | |
| 2002/0143997 A1 | 10/2002 | Huang et al. | |
| 2002/0152102 A1 | 10/2002 | Brodersen et al. | |
| 2002/0161734 A1 | 10/2002 | Stauber et al. | |
| 2002/0162090 A1 | 10/2002 | Parnell et al. | |
| 2002/0165742 A1 | 11/2002 | Robins | |
| 2003/0004971 A1 | 1/2003 | Gong et al. | |
| 2003/0018705 A1 | 1/2003 | Chen et al. | |
| 2003/0018830 A1 | 1/2003 | Chen et al. | |
| 2003/0066031 A1 | 4/2003 | Laane | |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker | |
| 2003/0088545 A1 | 5/2003 | Subramaniam et al. | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187921 A1 | 10/2003 | Diec | |
| 2003/0189600 A1 | 10/2003 | Gune et al. | |
| 2003/0191743 A1 | 10/2003 | Brodersen et al. | |
| 2003/0204427 A1 | 10/2003 | Gune et al. | |
| 2003/0206192 A1 | 11/2003 | Chen et al. | |
| 2003/0225730 A1 | 12/2003 | Warner et al. | |
| 2004/0001092 A1 | 1/2004 | Rothwein et al. | |
| 2004/0010489 A1 | 1/2004 | Rio | |
| 2004/0015981 A1 | 1/2004 | Coker et al. | |
| 2004/0027388 A1 | 2/2004 | Berg et al. | |
| 2004/0128001 A1 | 7/2004 | Levin et al. | |
| 2004/0186860 A1 | 9/2004 | Lee et al. | |
| 2004/0193510 A1 | 9/2004 | Catahan, Jr. et al. | |
| 2004/0199489 A1 | 10/2004 | Barnes-Leon et al. | |
| 2004/0199536 A1 | 10/2004 | Barnes Leon et al. | |
| 2004/0199543 A1 | 10/2004 | Braud et al. | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0091098 A1 | 4/2005 | Brodersen et al. | |
| 2007/0276861 A1 * | 11/2007 | Pryce et al. | 707/103 R |
| 2011/0010394 A1 * | 1/2011 | Carew et al. | 707/793 |
| 2011/0282866 A1 * | 11/2011 | Erickson et al. | 707/722 |
| 2012/0030172 A1 * | 2/2012 | Pareek et al. | 707/635 |

* cited by examiner

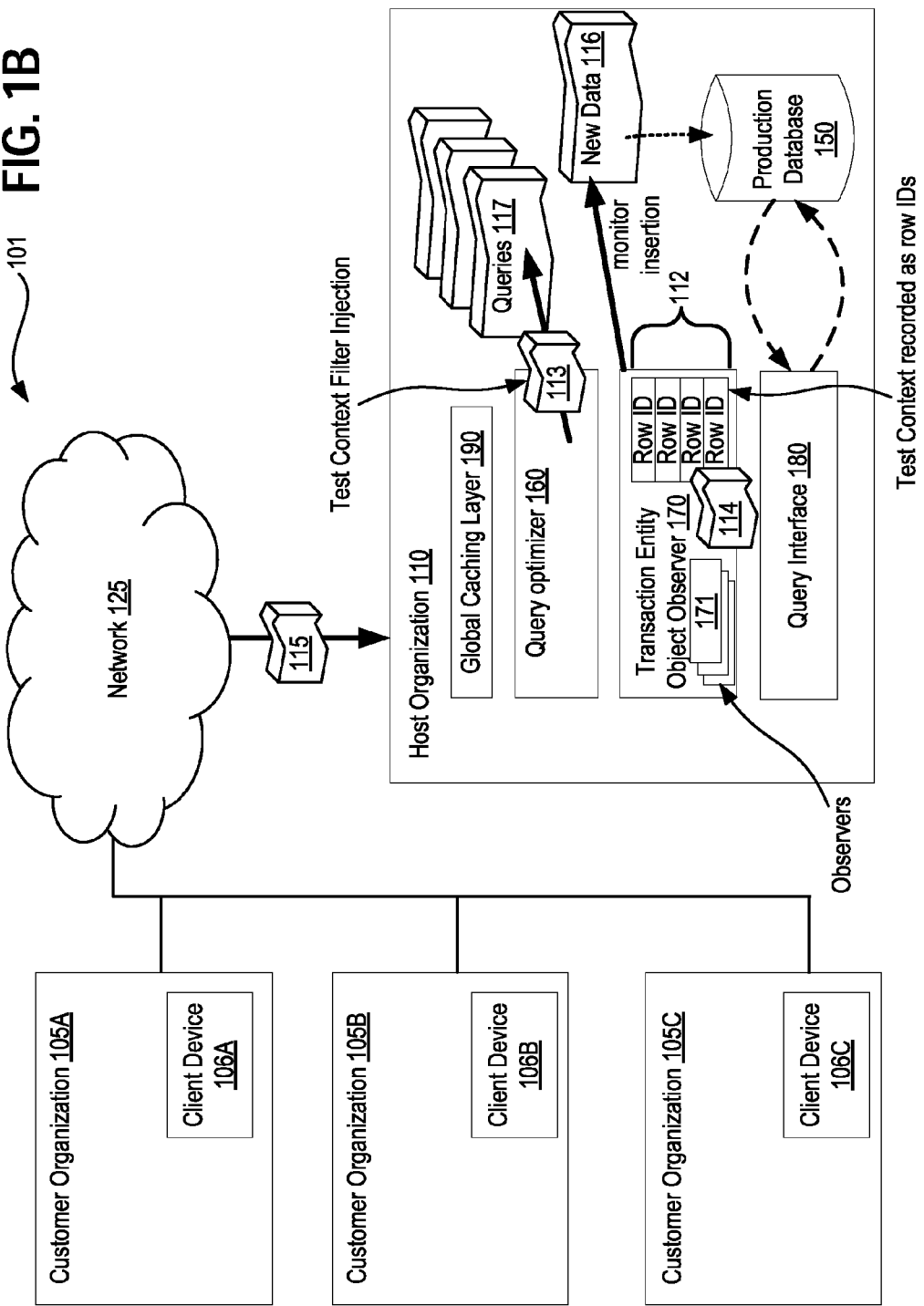

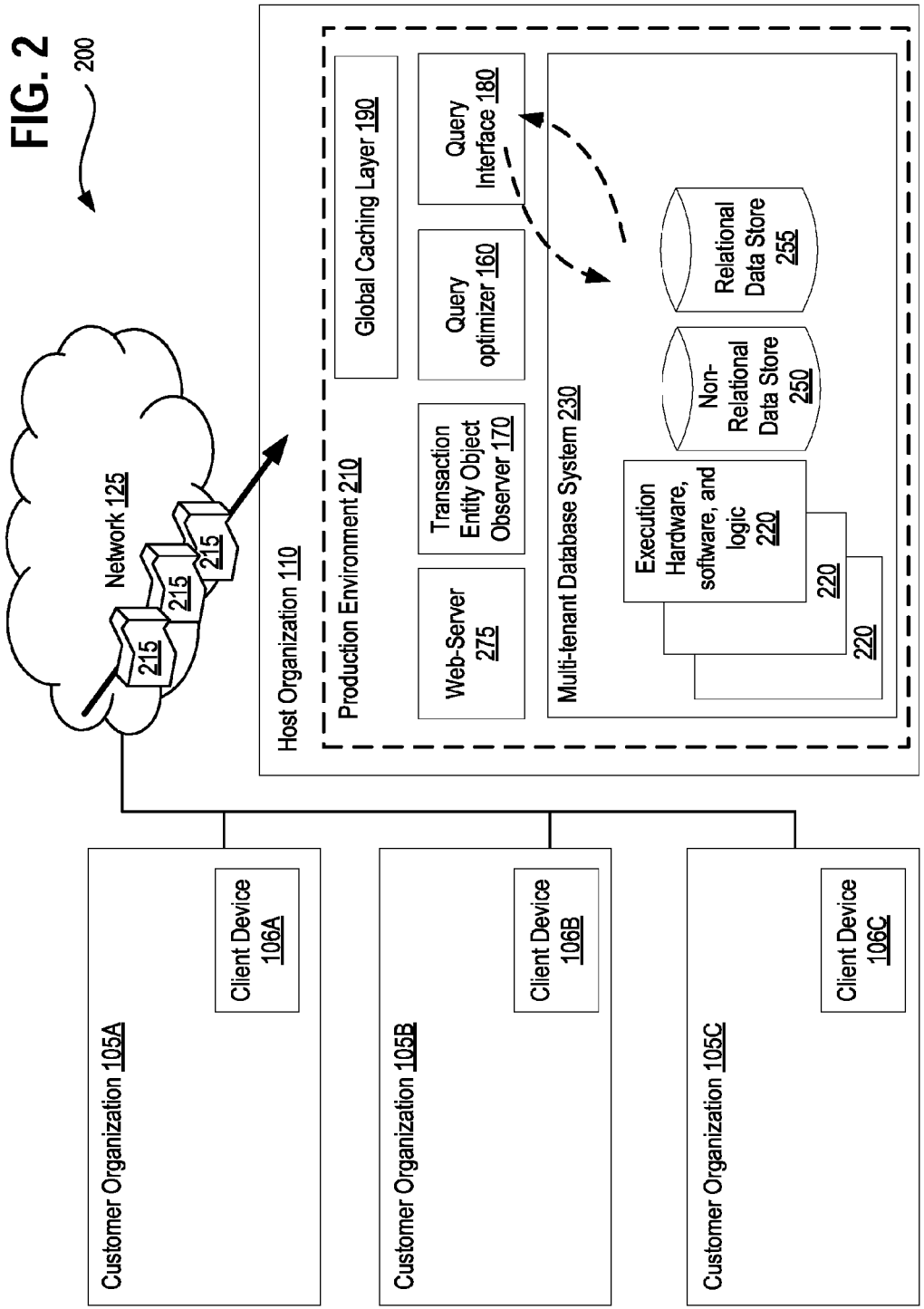

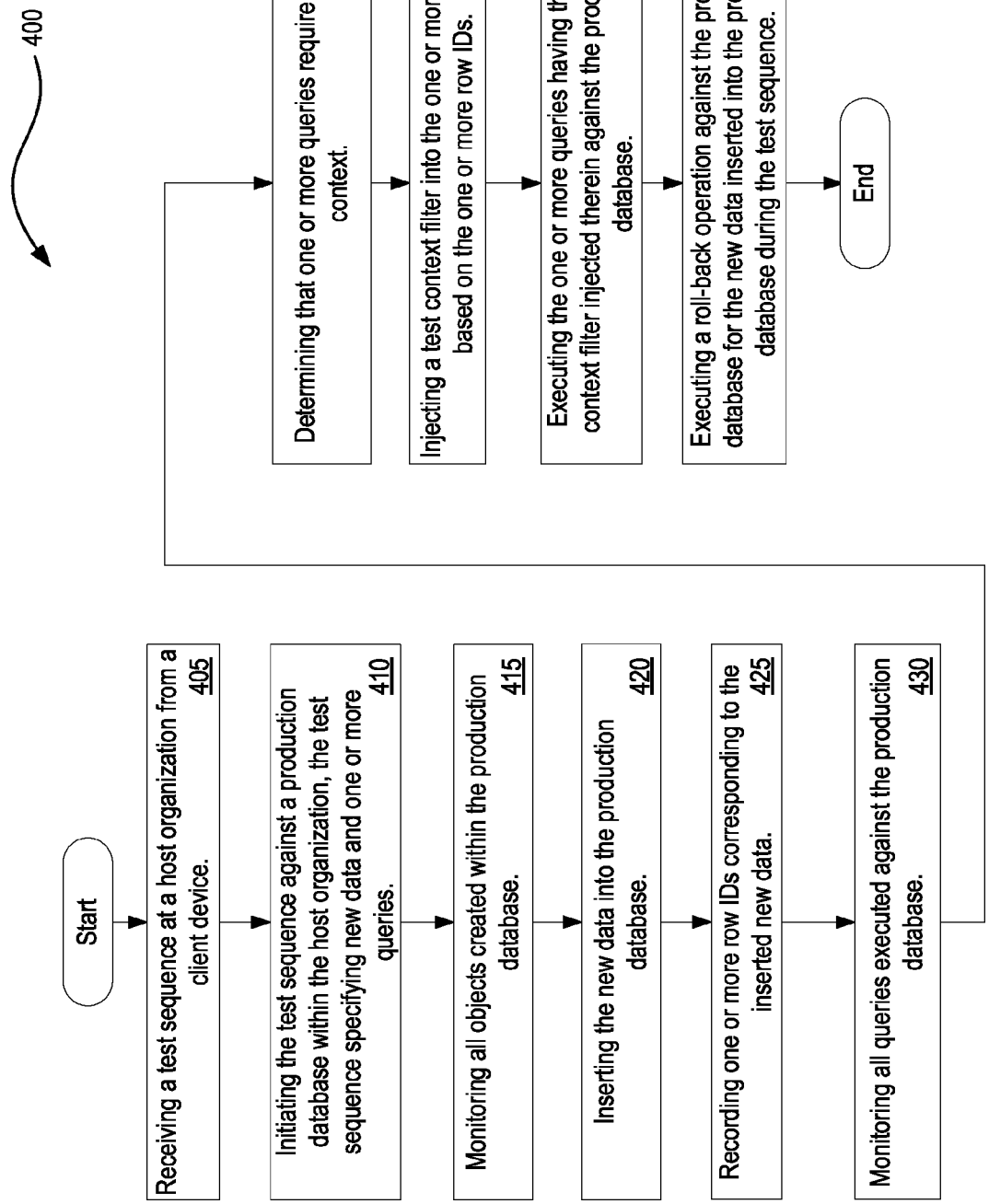

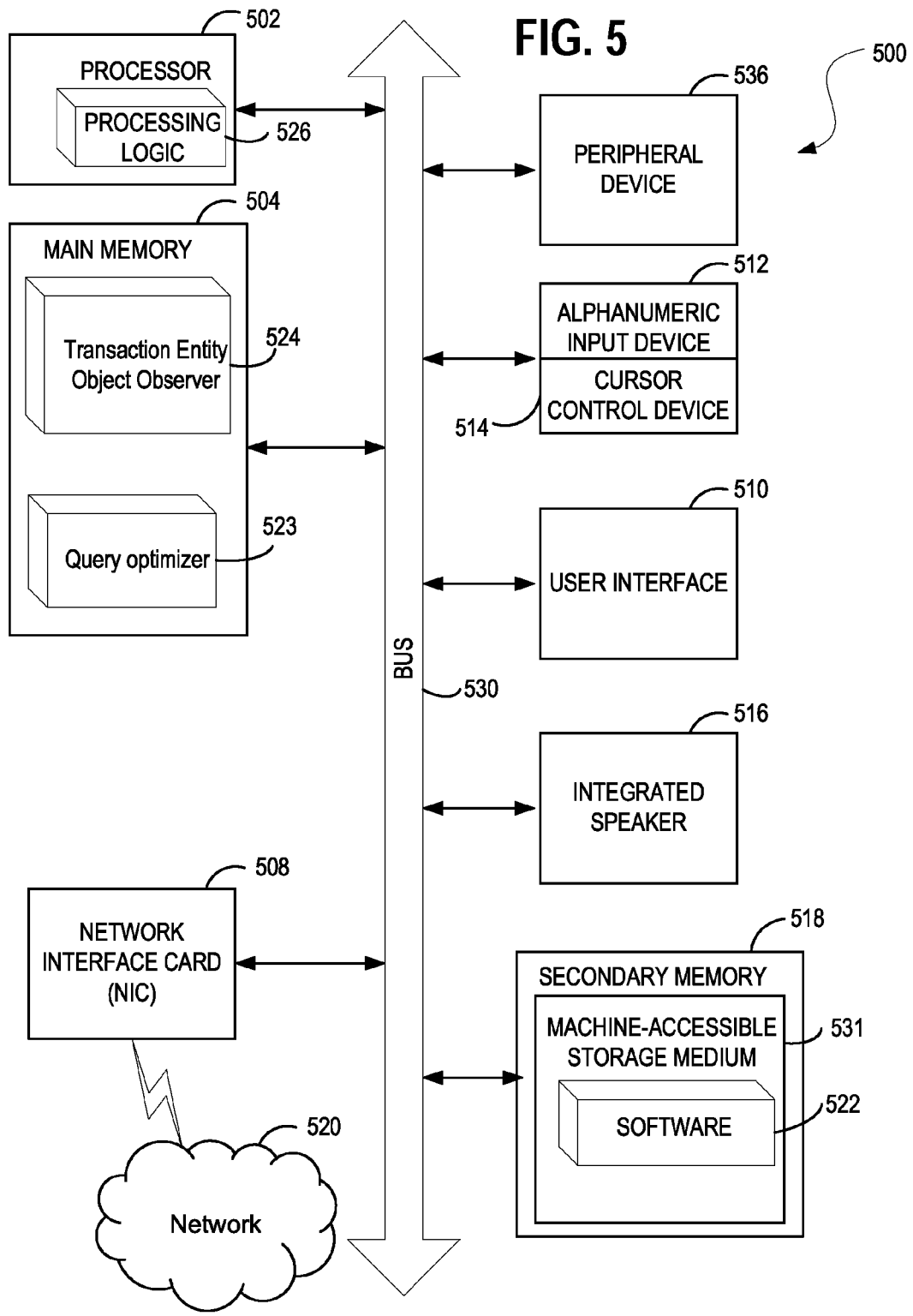

TESTING DATA SILO

CLAIM OF PRIORITY

This application is related to, and claims priority to, the provisional utility application entitled "APEX TESTING DATA SILO," filed on Jul. 1, 2011, having an application number of 61/503,754 and the entire contents of which are incorporated herein by reference

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments relate generally to the field of computing, and more particularly, to methods and systems for creating a data silo and testing with a data silo in an on-demand service environment.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to the claimed embodiments.

There is a widely understood need to test code before releasing the code into production.

One approach for testing code, particularly in an on-demand system, is to create a development environment which is separate from the production environment and run tests in that development environment. In such a way, side-effects resulting from running the tests purportedly do not negatively influence the production environment. However, several problems exist with such a model. First, in an on-demand system, the development and production environments may use the same infrastructure. Hence, the development environment uses resources that could be used for production work, resulting in a less efficient production environment. Further, data in the development environment may not be identical to that within a live production environment. For example, there may always be delays between the data in the production environment and the copy represented within the development environment. Tests written to rely upon such production data may therefore fail in a development environment due to a lack of data fidelity. Tests written in a particular context, such as with the assumption of a certain level of data access, may also trigger a failure where access levels or context is not the same between a development environment and a production environment. Additional problems may arise because the physical infrastructure of the development environment is not precisely identical to the production environment. For example, the development environment may be scaled down, may be implemented on older or different hardware, may be subject to different resource demands which affect stress, heat, latency, etc.

A different approach is to perform tests within the live production environment using live production data. This approach is advocated by some working with database systems that implement transaction journaling and roll-back capability. The argument in support of such an approach is that any transaction against the database may be rolled back, so long as it is not committed, thus preventing negative side-effects to the database or the production environment. Notwithstanding such justification, this model is also flawed. For example, if a test sequence acts upon a data element of production data, such as a database field or row, that test sequence may cause a lock on the corresponding data element, which in turn may cause a data access failure for a production transaction. The resulting data access failure is undesirable as it preempts higher value production work from being completed. Further problems and undesirable side-effects from testing upon a production environment may occur where the test transacts against a large number of database elements, thus requiring a rollback to a large number of transactions. Such a rollback creates operational burden for the database which may negatively affect performance of production transactions which are being processed concurrently.

The present state of the art may therefore benefit from a testing data silo, including methods, systems, and apparatuses for creating a data silo and testing with a data silo in an on-demand service environment as described herein.

BRIEF DESCRIPTION OF THE DRAWINGS

Embodiments are illustrated by way of example, and not by way of limitation, and will be more fully understood with reference to the following detailed description when considered in connection with the figures in which:

FIG. 1B depicts an alternative exemplary architectural overview of the environment in which embodiments may operate;

FIG. 2 depicts an alternative exemplary architectural overview of the environment in which embodiments may operate;

FIG. 4 is a flow diagram illustrating a method for creating a data silo and testing with a data silo in an on-demand service environment in accordance with disclosed embodiments; and FIG. 5 illustrates a diagrammatic representation of a machine in the exemplary form of a computer system, in accordance with one embodiment.

DETAILED DESCRIPTION

Figure 1A:
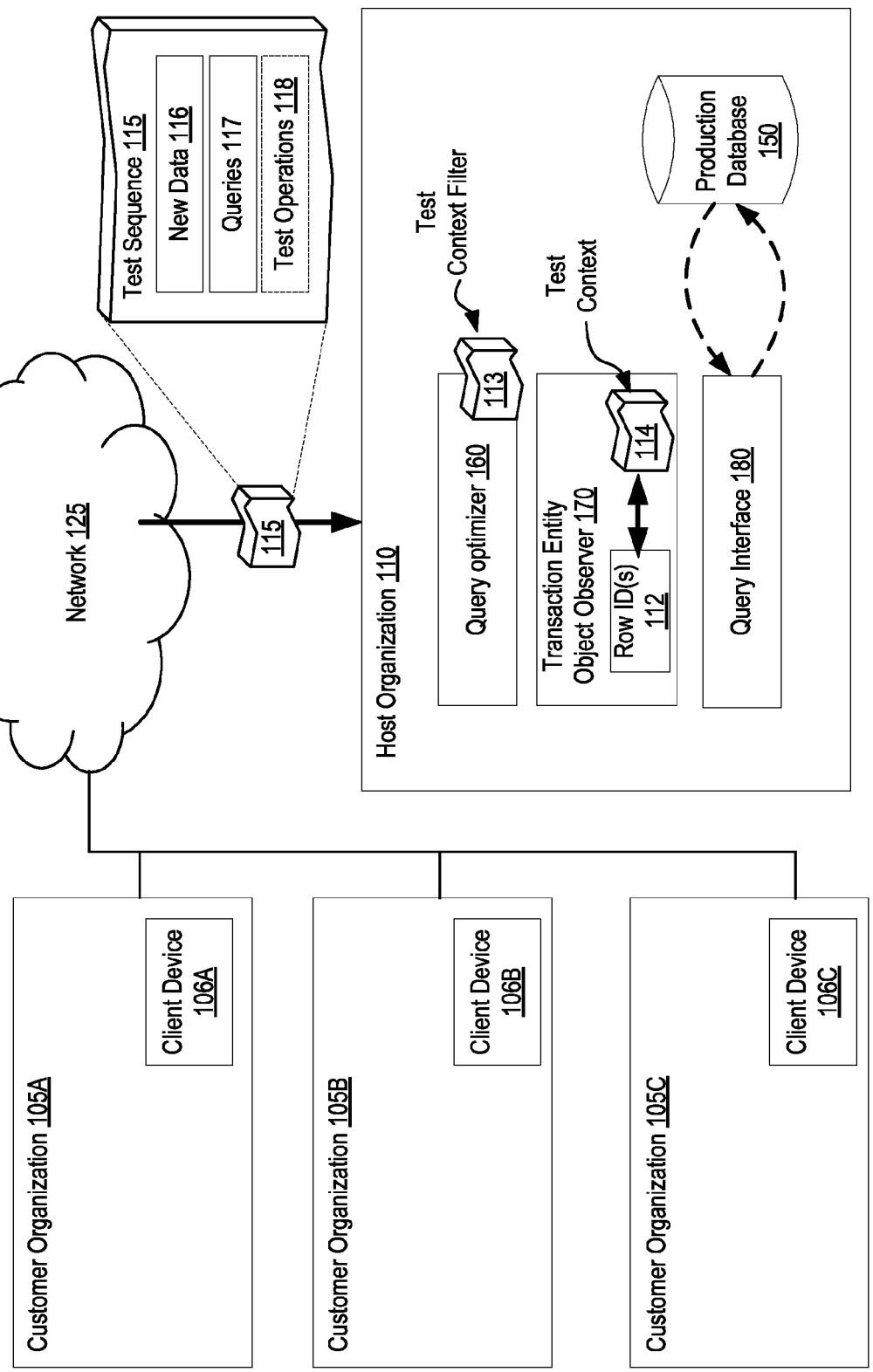
FIG. 1A depicts an exemplary architectural overview of the environment in which embodiments may operate.

Described herein are systems, devices, and methods for a testing data silo, including methods, systems, and apparatuses for creating a data silo and testing with a data silo in an on-demand service environment.

In one embodiment, such mechanisms include initiating a test sequence against a production database within a host organization, wherein the test sequence specifies: (a) new data for insertion into the production database during the test sequence and (b) one or more queries against the production database during the test sequence. Such mechanisms further include inserting the new data into the production database; recording one or more row identifiers (IDs) corresponding to the inserted new data; injecting a test context filter into the one or more queries based on the one or more row IDs; and executing the one or more queries having the test context filter injected therein against the production database, wherein the scope of the one or more queries is restricted, via the test context filter, to only the new data inserted into the production database during the test sequence.

In the following description, numerous specific details are set forth such as examples of specific systems, languages, components, etc., in order to provide a thorough understanding of the various embodiments. It will be apparent, however, to one skilled in the art that these specific details need not be employed to practice the embodiments disclosed herein. In other instances, well known materials or methods have not been described in detail in order to avoid unnecessarily obscuring the disclosed embodiments.

In addition to various hardware components depicted in the figures and described herein, embodiments further include various operations which are described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software.

Embodiments also relate to an apparatus for performing the operations disclosed herein. This apparatus may be specially constructed for the required purposes, or it may be a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, embodiments are not described with reference to any particular programming language. It will be appreciated that a variety of programming languages may be used to implement the teachings of the embodiments as described herein.

Embodiments may be provided as a computer program product, or software, that may include a machine-readable medium having stored thereon instructions, which may be used to program a computer system (or other electronic devices) to perform a process according to the disclosed embodiments. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical), etc.

Any of the disclosed embodiments may be used alone or together with one another in any combination. Although various embodiments may have been partially motivated by deficiencies with conventional techniques and approaches, some of which are described or alluded to within the specification, the embodiments need not necessarily address or solve any of these deficiencies, but rather, may address only some of the deficiencies, address none of the deficiencies, or be directed toward different deficiencies and problems where are not directly discussed.

FIG. 1A illustrates an exemplary architecture 100 in which embodiments may operate. Architecture 100 depicts a host organization 110 communicably interfaced with several customer organizations (105A, 105B, and 105C) via network 125. Within the host organization 110 is a query optimizer 160, a Transaction Entity Object Observer 170, a query interface 180, and a production database 150. The various customer organizations 105A-C each include at least one client device, depicted as 106A, 106B, and 106C respectively.

In accordance with one embodiment, a test sequence 115 is initiated against a production database 150 within a host organization 110. In such an embodiment, the test sequence 115 specifies: (a) new data 116 for insertion into the production database 150 during the test sequence and further specifies (b) one or more queries 117 to be executed against the production database 150 during the test sequence 115. The new data 116 is inserted into the production database 150 and one or more row IDs 112 corresponding to the inserted new data 116 are recorded. A test context filter 113 is injected into the one or more queries 117 based on the one or more row IDs 112 and the one or more queries 117, having the test context filter 113 injected therein, are executed against the production database 150. In such an embodiment, the scope of the one or more queries 117 is restricted, via the test context filter 113, to only the new data 116 inserted into the production database 150 during the test sequence 115. Stated differently, the scope of the one or more queries 117 is restricted to the test context 114.

In accordance with one embodiment, recording the one or more row IDs 112 associates the new data 116 with the test context 114. In such an embodiment, the text context 114 corresponds to the one or more row IDs 112 identifying one or more new rows in the production database 150 as part of inserting the new data 116. The new data 116 is associated with the test context 114 through the recordation of the one or more row IDs which represent the new rows which are inserted into the production database 150 in fulfillment of inserting the new data 116. For example, the one or more row IDs 112 may correspond to unique identifying keys within the production database. A transaction entity object observer 170 of the host organization 110 may track the insertion of the new data 116 to associate, indicate, or otherwise identify the new data 116 as being associated with the test context 114 by generating a table or a list of the row IDs 112. Thus, test context 114 may operate as a test context indicator, as a test context associator, and so forth.

Based on the test context 114 and the corresponding one or more row IDs 112 identifying new rows in the production database 150 for the inserted new data 116, the test context filters 113 may be generated and injected into the one or more queries 117 to limit the query scope to the test context 114. Thus, in accordance with one embodiment, a test context filter 113 is inserted into the one or more queries 117 that are to be transacted against the production database 150. For example a query optimizer 160 may insert the context filter 113 into the one or more queries 117. In such an embodiment, the host organization 110 executes the one or more queries 117 having the test context filter 113 injected therein against the production database 150. In such an embodiment, the scope of the one or more queries 117 is restricted, via the test context filter 113 injected into the respective one or more queries 117. For example, the scope of the one or more queries 117 may be limited or restricted to only the new data 116 which has been inserted into the production database 150 during the test sequence 115. A query interface 180 may transact with the production database 150 to insert the new data 116 and may further transact with the production database 150 to execute the one or more queries 117 having the text context filters 113 injected therein.

In such a way a "data silo" is created in the test context in which the data silo only allows the test to query data that was created during the test and created via the test. For example, a customer organization 105A, 105B, or 105C may specify new data 116 to be created during the test for insertion into the production database 150 in accordance with the specified test sequence 115. Such new data 116 specified as a part of the test sequence 115 may look like the live production data belonging to the customer organization 105A-C, yet nevertheless remain separate (e.g., siloed or isolated) from the customer organization's 105A-C live production data. In this way, a developer may perform testing in a live production system, such as the production database 150 of the host organization 110 and thus utilize the very same environment in which the code will operate if released into operation, but still maintain isolation of test data and test transactions from affecting or operating upon live production data.

It is unusual and counter-intuitive to perform test in a production environment as is taught herein. The very familiar problem of test events colliding with production data and affecting production performance must be overcome and is conventionally avoided all together. However, creation and use of the data silo permits testing in a production environment, on production systems, without affecting the production data. Such an approach therefore provides several benefits. First unlike methods which utilize a separate development environment or "sandbox," code may be tested in the actual operational environment in which it will operate upon release. Therefore, problems such as scale, latency, different underlying hardware, firmware, or other characteristics which differentiate a development environment from a production environment are overcome because the code is tested within the operational environment. Problems associated with data access contention due to, for example, a lock placed upon a data element associated with production data by a test operation, thus triggering a production transaction data failure, are additionally overcome. This is because new data 116 introduced to the production database 150 during the test sequence 115 will not be discoverable to production transactions because the new data 116 is associated with the test context 114 and not a production context. Additionally, new data 116 may be inserted into the production database 150 without committing the new data 116, thus rendering the new data 116 undiscoverable to production transactions operating within the same live production environment and transacting against the same production database 150. These and other benefits may be realized through practice of the disclosed embodiments.

Consider the following exemplary code snippet. First, assume that a customer organization 105A-C already has a number of preexisting accounts stored within the production database 150 as live production data having a production context. A developer may, in accordance with the disclosed embodiments, create a test sequence 115 such as the following:

```
@IsTest public static void testDataSilo( ) {
Account acc = new Account(name='just_for_test');
insert acc;
List<Account> accounts = [select id, name from Account];
System.assertEquals(1, accounts.size( ));
System.assertEquals('just_for_test', accounts[0].name);
}
```

As is seen in the above example code snippet, a test sequence is declared via the testDataSilo( ) function and a new account is created from within the test sequence 115, thus introducing new data 116. The new data 116 is queried (e.g., via queries 117), and some additional test operations 118 are performed to check the received data.

Continuing with the above example, a customer may develop a test sequence 115 that tests, for example, a trigger on an account. The trigger in this example, creates a new column on account that derives or calculates a priority for the account, and stores that priority back into the priority column as a numeric priority value. Such a trigger should automatically look at other fields any time an account is created and then derive, calculate, or determine an appropriate priority (e.g., based on business rules, business logic, etc.) from the other fields in accordance with the trigger design. The trigger should then place the appropriate numeric value into the priority column.

In order to test the implementation, the test sequence will (1) insert a new account into the production database without specifying any priority for the account, (2) query the account back out of the production database and check what the priority is, thus testing whether the trigger launched properly and populated a priority into the appropriate column. The business logic or rules may further be tested by (3) asserting that queried value for priority matches what it is supposed to be, according to the business logic, rules, etc. For example, the test sequence 115 may specify 'System.assert(acc.priority==2)' or some equivalent operation to verify the derived or calculated value is as expected.

Turning back to the description set forth at FIG. 1, test context 114 is depicted which may be associated with new data 116 created during a test sequence 115. The test context 114 and corresponding row IDs 112 recorded when the new data 116 was inserted is be utilized to associate data elements (such as new rows) in the production database 150 as being associated with a test sequence 115 or characterize such data elements as test data, rather than live production data, despite the data elements being stored within the same production database 150. The production database 150 may itself operate without knowledge of any special context or status of the various data types described herein. However, metadata, such as test context 114 and corresponding row IDs 112 permit the host organization 110 and its complimentary systems to have a fuller understanding of data within the production database 150, such as whether or not any particular data element or row is within the scope of a test context or a production context.

Thus, in accordance with one embodiment, a first plurality of elements stored within the production database 150 are associated with the test context 114 and are therefore queryable within the scope of the one or more queries 117 of the test sequence. For example, the row IDs 112 may identify or associate the first plurality of elements as belonging to the test sequence 115 or as being within the test context 114 ad thus, the queryable scope, of the test sequence 115. Conversely, a second plurality of elements stored within the production database 150 which are not associated with the test context 114 based on row IDs 112 are filtered out of the query scope of the one or more queries 117 of the test sequence 115 via the test context filter 113 injected into the one or more queries 117. Database elements which are not associated with the test context 114 are part of a production context. Such elements need not be identified explicitly as production context, rather, the lack of a test context 114 association makes them readily identifiable as within a production context or a production query scope or at least identifies them as not being within the scope of a test context 114. Alternatively, their absence from the listing or table of row IDs 112 identifies them as distinct from the test context 114.

In one embodiment, injecting the test context filter 113 into the one or more queries 117 includes at least one of the following operations: associating data with a test context indicator; adding a test context indicator to a new table name created pursuant to inserting the new data 116 into the production database 150; adding a test context indicator to a new object name created pursuant to inserting the new data 116 into the production database 150; adding a test context indicator to a new record key created pursuant to inserting the new data 116 into the production database 150; adding a test context indicator to a field or column name created pursuant to inserting the new data 116 into the production database 150; and adding a test context indicator to an account created pursuant to inserting the new data 116 into the production database 150. In such an embodiment, the test context indicators correspond to, point to, or identify the test context 114, thus associating the targeted data elements as being within the scope of the test context 114.

In one embodiment, inserting the new data 116 into the production database 150 includes inserting the new data 116 without committing the new data 116 to the production database 150. For example, where a database maintains a journal or log of pending but uncommitted transactions (e.g., inserts, deletes, updates, etc.), the new data 116 may be introduced, inserted, or added to the production database 150 without actually committing the data. Until the data is committed, the data is not yet persistent in the database and the transaction or series of transactions may be undone via a roll-back operation.

In one embodiment, the host organization executes a roll-back operation against the production database 150 for the new data 116 inserted into the production database 150 during the test sequence 115. In such an embodiment, the roll-back operation is initiated responsive to the test sequence 115 terminating. For example, whether the test sequence 115 terminates successfully or unsuccessfully, the isolated test data associated with the test context 114 needs to be removed, and this is accomplished via a roll-back operation. In some embodiments a transaction layer implemented via the query interface 180 additionally or alternatively deletes a mapping created by the transaction entity object observer 170, thus destroying all threads and context associated with the test context 114 initiated by the test sequence 115 within the transaction layer.

In one embodiment, the host organization 110 receives the test sequence 115 from a client device 106A-C. In such an embodiment, initiating the test sequence 115 against the production database 150 includes initiating the received test sequence 115 on behalf of the client device 106A-C responsive to receiving the test sequence 115. For example, the test sequence 115 may arrive as a request for processing at the host organization, in which the request specifies the test sequence 115, and the host organization 110 then initiates processing of the test sequence 115 accordingly.

In one embodiment, the received test sequence 115 includes a listing of instructions specifying the new data 116 to be inserted into the production database 150 during the test sequence 115. In one embodiment, the listing of instructions additionally specifies the one or more queries 117 to be executed against the production database 150 during the test sequence 115. In another embodiment, the listing of instructions further specifies one or more additional test operations 118 to be performed by the host organization 110. For example, such test operations 118 may include triggers, comparisons, calculations, and so forth, as necessary to fulfill the design requirements of the test.

In one embodiment, the test sequence 115 further specifies one or more test operations 118 selected from the group of test operations including: computing a result based at least in part on the one or more queries 117 against the production database 150 during the test sequence 115; implementing a trigger for an element of the new data 116 inserted into the production database 150, in which the trigger causes the production database 150 to compute or derive non-specified data responsive to the new data 116 being inserted into the production database 150 and further in which the trigger causes the non-specified data to be inserted into the production database 150. In one embodiment the one or more test operations 118 include reading the non-specified data from the production database 150. In another embodiment, the one or more test operations 118 include determining whether the trigger was implemented successfully based upon the reading of the non-specified data from the production database 150 and based further upon comparing the non-specified data against an expected result or a threshold.

FIG. 1B depicts an alternative exemplary architectural overview of the environment 101 in which embodiments may operate.

The test sequence 115 itself may operate wholly agnostic or ignorant to operations undertaken by the host organization to associate the new data 116 with the test context 114 and/or to inject test context filters 113 into the one or more queries 117. For example, a developer of the test sequence 115 need not take any special action to practice the disclosed embodiments. Rather, the host organization 110 may implement the described operations as an enforcement mechanism to ensure that test sequences 115 operate only upon siloed test data, such as new data 116 which is created during a test sequence 115.

In some embodiments, each of many test sequences 115 received by the host organization 110 triggers generation of a unique test context 114. In other situations, test context 114 is unique to a customer organization 105A-C but shared across multiple test sequences associated with a single customer organization 105A-C. In other embodiments, a test context 114 is shared across multiple customer organizations 105A-C or may alternatively be generic across the entire host organization 110 and thus, such a generic test context 114 would be within a test context for any and all test sequences 115 regardless of source or affiliation.

In one embodiment, the transaction entity object observer 170 of the host organization 110 monitors all objects created within the production database 150 via one or more observers 171. For example, the transaction entity object observer 170 instantiates many distinct observers 171, each to monitor one of many executing threads. Thus, in accordance with one embodiment, every thread has one distinct observer 171 instantiated by the transaction entity object observer 170 whether or not that thread is running a test sequence 115 or associated with a test context 114. In accordance with one embodiment, each test context 114 corresponds to an execution thread, and a separate and unique observer 171 instantiated by the transaction entity object observer 170 monitors execution of the thread.

In one embodiment, the Transaction Entity Object Observer 170 associates the new data 116 with a test context 114 based on the new data 116 being associated with the test sequence 115. The transaction entity object observer 170 may associate the new data 116 with the test context 114 on the basis of the new data 116 being specified by the test sequence 115 or inserted into the production database 150 during the test sequence 115. For example, a test sequence 115 that declares itself as being a test, utilizes a testing API, or implements a test function, provides a determinable characteristic that such a test sequence 115 is appropriately associated with a test context 114 by the mechanisms of the host organization 110.

In one embodiment, the query optimizer 160 of the host organization 110 monitors all queries 117 executed against the production database 150. In one embodiment, the query optimizer 160 determines whether the one or more queries 117 require restriction to the test context 114 based on the one or more queries 117 being associated with the test sequence 115. For example, where the query optimizer 160 determines the one or more queries 117 are associated with a test sequence, the query optimizer 160 may responsively restrict the query scope accessible to such queries 117 such that the queries do not exceed their authorized scope which is represented by the elements stored in the database associated with the test context 114. Stated differently, the query scope may be limited, restricted, or narrowed such that elements associated with a production context are not viewable, discoverable, or queryable.

In one embodiment, the query optimizer 160 injects the test context filter 113 into the one or more queries 117 based on the determination that such queries 117 are associated with a test sequence 115.

In one embodiment, the query optimizer 160 of the host organization 110 injects the test context filter 113 into the one or more queries 117 by performing at least one of the following operations for each of the one or more queries 117: narrowing a query scope specified by the query 117 to a plurality of elements in the production database 150 associated with a test context indicator; adding a test context indicator to a table name specified by the query 117; adding a test context indicator to an object name specified by the query 117; adding a test context indicator to a record key specified by the query 117; adding a test context indicator to a field or column name specified by the query 117; adding a test context indicator to an account specified by the query 117; adding or pre-pending a pre-query to limit a query scope to only elements associated with the test context 114; and adding or pre-pending a clause into the query 117 requiring that query results match the test context filter 113.

Some data may not be stored within the production database, but is instead stored elsewhere within a production environment of the host organization 110. For example, metadata may not be stored in the database, but must nevertheless be made available to the test context 114 while the test is running. Custom metadata may be cached and accessed through a separate code path that goes to cache, such as to a global caching layer 190. Cached data may be stored and retrieved via keys. For example, a key may include (1) an org id, (2) the type of data, and (3) an ID of the object with the data which actually stores the data. Such cached data may additionally be marked with a test context 114 to appropriately associate the metadata with the test context 114.

Thus, in accordance with one embodiment, the test sequence 115 further specifies new cache data to be cached by the host organization 110 external to the production database 150. In such an embodiment, the host organization marks the new cache data with the test context 114 to provide an association. The transaction entity object observer may perform such a marking operation on cache data. In one embodiment, marking the new cache data with the test context 114 includes modifying one or more keys identifying the new cache data in the global caching layer 190 with a test context indicator which corresponds to, identifies, points to, or provides an association with test context 114.

In one embodiment, the host organization inserts the new cache data into a global caching layer 190 of the host organization 110. In one embodiment, the host organization further injects the test context filter 113 into all cache reads initiated on behalf of the test sequence 115. For example, the query optimizer may perform such an injection operation. Alternatively, a distinct entity which is responsible for routing the cache read or performing the cache read may perform the injection operation to limit scope appropriately to the test context 114. In one embodiment, the new cache data is removed from the global caching layer 190 responsive to the test sequence 115 terminating.

FIG. 2 depicts an alternative exemplary architectural overview 200 of the environment in which embodiments may operate.

In one embodiment, the production database 150 is communicably interfaced with a plurality of client devices 106A-C through the host organization 110 and operates within a production environment 210 of the host organization 110. In one embodiment, the production database stores live production data on behalf of the plurality of client devices 106A-C.

In one embodiment, the production database 150 of the host organization 110 as set forth at FIGS. 1A and 1B includes or implements a multi-tenant database system 230 within the host organization as is depicted in the embodiment of FIG. 2. In such an embodiment, the host organization 110 receives the test sequence as one of a plurality of requests 215 received from a plurality of customer organizations 105A-C. For example, the incoming test sequence and incoming requests are to be processed against the multi-tenant database system 230.

In one embodiment, each customer organization 105A-C is an entity selected from the group consisting of: a separate and distinct remote organization, an organizational group within the host organization 110, a business partner of the host organization 110, or a customer organization 105A-C that subscribes to cloud computing services provided by the host organization 110.

Multi-tenant database system 230 includes a plurality of underlying hardware, software, and logic elements 220 that implement database functionality and a code execution environment within the host organization 110. In accordance with one embodiment, multi-tenant database system 230 implements a non-relational data store 250 and a relational data store 255. The hardware, software, and logic elements 220 of the multi-tenant database system 230 are separate and distinct from a plurality of customer organizations (105A, 105B, and 105C) which utilize the services provided by the host organization 110 by communicably interfacing to the host organization 110 via network 125. In such a way, host organization 110 may implement on-demand services, on-demand database services or cloud computing services to subscribing customer organizations 105A-C.

Thus, in accordance with one embodiment, the multi-tenant database system 230 implements hardware and software 220 elements that are shared by a plurality of separate and distinct customer organizations 105A-C, each of the separate and distinct customer organizations being remotely located from the host organization 110 having the multi-tenant database system 230 operating therein.

In one embodiment, data requests 215 are received at, or submitted to, a web-server 275 within host organization 110. Host organization 110 may receive a variety of requests for processing by the host organization 110 and its multi-tenant database system 230, including the test sequences 115 which may arrive as an incoming request 215. Such data requests 215 may be received from one or more of the plurality of customer organizations 105A-105C via the network 125. Incoming data requests 215 received at web-server 275 may specify which services from the host organization 110 are to be provided, such as query requests, search request, status requests, data base transactions, a processing request to retrieve, update, or store data on behalf of one of the customer organizations 105A-C, and so forth. Web-server 275 may be responsible for receiving data requests 215 from various customer organizations 105A-C via network 125 and provide a web-based interface to an end-user client machine originating such data requests 215, for example, a client computing device at or operating within a customer organization 105A-C.

In accordance with one embodiment, a non-transitory computer readable storage medium stores instructions that, when executed by a system in a host organization 110, for example, when executed by a processor and memory of such a system, the instructions cause the system to perform operations including: initiating a test sequence 115 against a production database 150 within the host organization 110, in which the test sequence 115 specifies: (a) new data 116 for insertion into the production database 150 during the test sequence and further specifies (b) one or more queries 117 to be executed against the production database 150 during the test sequence 115. The new data 116 is inserted into the production database 150 and one or more row IDs 112 corresponding to the inserted new data 116 are recorded. A test context filter 113 is injected into the one or more queries 117 based on the one or more row IDs 112 and the one or more queries 117, having the test context filter 113 injected therein, are executed against the production database 150. In such an embodiment, the scope of the one or more queries 117 is restricted, via the test context filter 113, to only the new data 116 inserted into the production database 150 during the test sequence 115.

Figure 3:
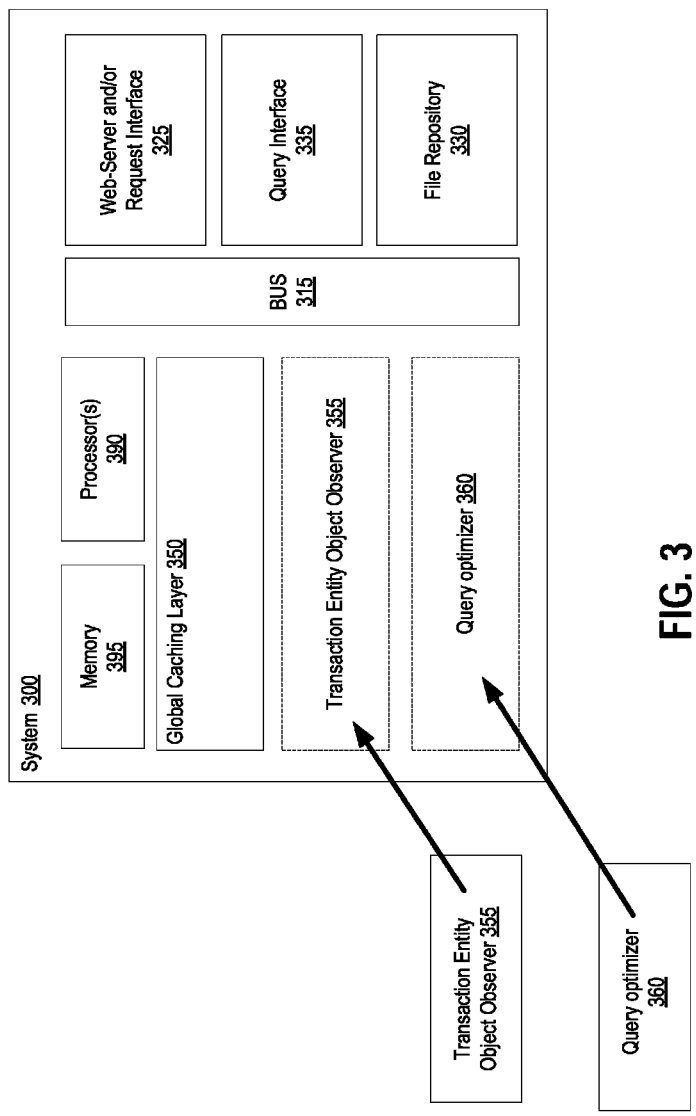
FIG. 3 shows a diagrammatic representation of a system in which embodiments may operate, be installed, integrated, or configured.

FIG. 3 shows a diagrammatic representation of a system 300 in which embodiments may operate, be installed, integrated, or configured.

In one embodiment, system 300 includes a memory 395 and a processor or processors 390. For example, memory 395 may store instructions to be executed and processor(s) 390 may execute such instructions. System 300 includes bus 315 to transfer transactions and data within system 300 among a plurality of peripheral devices communicably interfaced with bus 315. System 300 further includes web-server and/or request interface 325, for example, to receive data requests including those specifying test sequences, to return responses, and to otherwise interface with remote clients, such as client devices located within customer organizations 105A-C. Web-server and/or request interface 325 may operate as a request interface to receive test sequences on behalf of the host organization in which the system 300 operates. Some transactions received at web-server 325 may be transaction requests to be transacted against a multi-tenant database system communicably interfaced with the host organization in which the system 300 operates.

System 300 is further depicted as having a query interface 335 to communicate queries to a connected database. System 300 includes file repository 330 to provide storage as necessary for the system 300. System 300 further includes global caching layer 350 to provide caching services to communicably interfaced devices and systems.

Distinct within system 300 is a transaction entity object observer 355 and also a query optimizer 360, either or both of which may be installed into system 300 or exist separate from system 300, either or both of which may further be hardware based, such that each is enabled by the hardware of system 300 in conjunction with the system 300's processor(s) 390 and memory 395 to carry out the described capabilities.

In accordance with one embodiment, such a system 300 includes a processor 390 to execute instructions; a request interface 325 to receive a test sequence from a client device in which the test sequence specifies: (a) new data for insertion into a production database during the test sequence and (b) one or more queries to be executed against the production database during the test sequence. Such a system 300 further includes a Transaction Entity Object Observer 355 a Transaction Entity Object Observer to associate the new data with a test context by recording one or more row IDs corresponding to the inserted new data; a query interface 335 to insert the new data into the production database; and a query optimizer 360 to inject a test context filter into the one or more queries based on the one or more row IDs. In such an embodiment, the query interface 335 is to execute the one or more queries having the test context filter injected therein against the production database. In such an embodiment, the scope of the one or more queries is restricted to only the new data inserted into the production database during the test sequence via the test context filter.

In one embodiment, the system 300 further includes a web-server 325 to implement the request interface to receive the test sequence from the client device. In one embodiment, a multi-tenant database system implements the production database and is communicably interfaced with the system.

FIG. 4 is a flow diagram illustrating a method 400 for creating a data silo and testing with a data silo in an on-demand service environment in accordance with disclosed embodiments. Method 400 may be performed by processing logic that may include hardware (e.g., circuitry, dedicated logic, programmable logic, microcode, etc.), software (e.g., instructions run on a processing device to perform various operations such receiving, generating, populating, storing, injecting, recording, marking, restricting, and transmitting information and data in pursuance of the creation and use of a test silo, or some combination thereof. In one embodiment, method 400 is performed by a hardware based system, such as system 300 set forth at FIG. 3. Some operations may be performed by a transaction entity object observer, by a query interface, by a query optimizer, or some combination thereof, as set forth within system 300 of FIG. 3. Some of the blocks and/or operations listed below are optional in accordance with certain embodiments. The numbering of the blocks presented is for the sake of clarity and is not intended to prescribe an order of operations in which the various blocks must occur.

Method 400 begins with processing logic for receiving a test sequence at a host organization from a client device (block 405).

At block 410, processing logic initiates a test sequence against a production database within the host organization, the test sequence specifying new data and one or more queries.

At block 415, processing logic monitors all objects created within the production database.

At block 420, processing logic inserts the new data into the production database.

At block 425, processing logic records one or more row IDs corresponding to the inserted new data.

At block 430, processing logic monitors all queries executed against the production database.

At block 435, processing logic determines that the one or more queries require the test context.

At block 440, processing logic injects a test context filter into the one or more queries based on the one or more row IDs.

At block 445, processing logic executes the one or more queries having the test context filter injected therein against the production database.

At block 450, processing logic executes a roll-back operation against the production database for the new data inserted into the production database during the test sequence.

FIG. 5 illustrates a diagrammatic representation of a machine 500 in the exemplary form of a computer system, in accordance with one embodiment, within which a set of instructions, for causing the machine/computer system 500 to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, as a peer machine in a peer-to-peer (or distributed) network environment, as a server or series of servers within an on-demand service environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processor 502, a main memory 504 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 518 (e.g., a persistent storage device including hard disk drives and a persistent database and/or a multi-tenant database implementation), which communicate with each other via a bus 530. Main memory 504 includes a transaction entity object observer 524 to associate new data with a test context where necessary. Main memory 504 further includes a query optimizer 523 to inject test context filters into queries where necessary. Main memory 504 and its sub-elements (e.g. 523 and 524) are operable in conjunction with processing logic 526 and processor 502 to perform the methodologies discussed herein.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 502 may also be one or more special-purpose processing devices such as an application specific integrated circuit (ASIC), a field programmable gate array (FPGA), a digital signal processor (DSP), network processor, or the like. Processor 502 is configured to execute the processing logic 526 for performing the operations and functionality which is discussed herein.

The computer system 500 may further include a network interface card 508. The computer system 500 also may include a user interface 510 (such as a video display unit, a liquid crystal display (LCD), or a cathode ray tube (CRT)), an alphanumeric input device 512 (e.g., a keyboard), a cursor control device 514 (e.g., a mouse), and a signal generation device 516 (e.g., an integrated speaker). The computer system 500 may further include peripheral device 536 (e.g., wireless or wired communication devices, memory devices, storage devices, audio processing devices, video processing devices, etc.).

The secondary memory 518 may include a non-transitory machine-readable or computer readable storage medium 531 on which is stored one or more sets of instructions (e.g., software 522) embodying any one or more of the methodologies or functions described herein. The software 522 may also reside, completely or at least partially, within the main memory 504 and/or within the processor 502 during execution thereof by the computer system 500, the main memory 504 and the processor 502 also constituting machine-readable storage media. The software 522 may further be transmitted or received over a network 520 via the network interface card 508.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as are apparent to those skilled in the art. Therefore, the scope of the appended claims should be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A method comprising:
 maintaining production data within a production database within a system of a host organization,
   the system having a processor and memory therein;
   initiating a test sequence against the production database within the system of the host organization, wherein the test sequence specifies:
   a) new data for insertion into the production database during the test sequence, and
   b) one or more queries limited only to the new data for execution against the production database during the test sequence, wherein the one or more queries cause a lock on data elements of the new data as specified by the one or more queries within the production database which in turn will trigger a data access failure for other production transactions requesting access to the locked data elements of the new data;

inserting the new data into the production database;

recording one or more row IDs corresponding to the inserted new data;

injecting a test context filter into the one or more queries based on the one or more row IDs; and executing the one or more queries having the test context filter injected therein against the production database, wherein the scope of the one or more queries is restricted to only the new data inserted into the production database during the test sequence via the test context filter preventing the new data introduced into to the production database during the test sequence from being discoverable to the production transactions due to the new data being associated with the test context and not a production context.

2. The method of claim 1:

wherein recording the one or more row IDs associates the new data with a test context; and wherein the text context corresponds to the one or more row IDs identifying one or more new rows in the production database as part of inserting the new data.

3. The method of claim 1:

wherein a first plurality of elements stored within the production database associated with the test context are queryable within the scope of the one or more queries of the test sequence; and wherein a second plurality of elements stored within the production database which are not associated with the test context are filtered out of the scope of the one or more queries of the test sequence via the test context filter injected into the one or more queries.

4. The method of claim 1, wherein injecting the test context filter into the one or more queries comprises at least one of:

associating data with a test context indicator;

adding a test context indicator to a new table name created pursuant to the inserting the new data into the production database;

adding a test context indicator to a new object name created pursuant to the inserting the new data into the production database;

adding a test context indicator to a new record key created pursuant to the inserting the new data into the production database;

adding a test context indicator to a field or column name created pursuant to the inserting the new data into the production database; and adding a test context indicator to an account created pursuant to the inserting the new data into the production database.

5. The method of claim 1, wherein inserting the new data into the production database comprises inserting the new data into the production database without committing the new data to the production database.

6. The method of claim 5, further comprising:

executing a roll-back operation against the production database for the new data inserted into the production database during the test sequence, wherein the roll-back operation is initiated responsive to the test sequence terminating.

7. The method of claim 1, further comprising:

receiving the test sequence at the host organization from a client device;

wherein initiating the test sequence against the production database comprises initiating the received test sequence on behalf of the client device responsive to receiving the test sequence; and wherein the received test sequence comprises a listing of instructions specifying the new data to be inserted into the production database during the test sequence, specifying the one or more queries to be executed against the production database during the test sequence, and specifying one or more additional test operations to be performed by the host organization.

8. The method of claim 1, further comprising:

monitoring, via one or more observers of a Transaction Entity Object Observer of the host organization, all objects created within the production database; and wherein recording the one or more row IDs for the inserted new data comprises the Transaction Entity Object Observer associating the new data with a test context based on the new data being associated with the test sequence.

9. The method of claim 1, further comprising:

monitoring, via a query optimizer of the host organization, all queries executed against the production database; and determining, via the query optimizer, that the one or more queries require the test context based on the one or more queries being associated with the test sequence; and wherein injecting the test context filter into the one or more queries comprises the query optimizer injecting the test context filter into the one or more queries based on the determination.

10. The method of claim 1, wherein injecting the test context filter into the one or more queries comprises a query optimizer of the host organization performing at least one of the following operations for each of the one or more queries:

narrowing a query scope specified by the query to a plurality of elements in the production database associated with a test context;

adding a test context indicator to a table name specified by the query;

adding a test context indicator to an object name specified by the query;

adding a test context indicator to a record key specified by the query;

adding a test context indicator to a field or column name specified by the query;

adding a test context indicator to an account specified by the query;

adding or pre-pending a pre-query to limit a query scope to only elements associated with the test context; and adding or pre-pending a clause into the query requiring that query results match the test context filter.

11. The method of claim 1, wherein the test sequence further specifies one or more test operations selected from the group of test operations comprising:

computing a result based at least in part on the one or more queries against the production database during the test sequence;

implementing a trigger for an element of the new data inserted into the production database, wherein the trigger causes the production database to compute or derive non-specified data responsive to the new data being inserted into the production database and wherein the trigger further causes the non-specified data to be inserted into the production database;

reading the non-specified data from the production database;

determining whether the trigger was implemented successfully based upon the reading of the non-specified data from the production database and based further upon comparing the non-specified data against an expected result or a threshold.

12. The method of claim 1, wherein the test sequence further specifies new cache data to be cached by the host organization external to the production database;
marking the new cache data with the test context;
inserting the new cache data into a global caching layer of the host organization;
injecting the test context filter into all cache reads initiated on behalf of the test sequence; and
removing the new cache data from the global caching layer responsive to the test sequence terminating.

13. The method of claim 12, wherein marking the new cache data with the test context comprises modifying one or more keys identifying the new cache data in the global caching layer with a test context indicator.

14. The method of claim 1:
wherein the production database is communicably interfaced with a plurality of client devices through the host organization and operates within a production environment of the host organization; and
wherein the production data stored within the production database comprises live production data stored on behalf of the plurality of client devices and accessible to the plurality of client devices due to the live production data being associated with the production context and not the test context.

15. The method of claim 1, wherein:
the production database of the host organization comprises a multi-tenant database system of the host organization; and
wherein the method further comprises:
receiving the test sequence at the host organization as one of a plurality of requests received from a plurality of customer organizations, wherein each customer organization is an entity selected from the group consisting of:
a separate and distinct remote organization, an organizational group within the host organization, a business partner of the host organization, or a customer organization that subscribes to cloud computing services provided by the host organization.

16. The method of claim 15, wherein the multi-tenant database system comprises elements of hardware and software that are shared by a plurality of separate and distinct customer organizations, each of the separate and distinct customer organizations being remotely located from the host organization having the multi-tenant database system operating therein.

17. A non-transitory computer readable storage medium having instructions stored thereon that, when executed by a system in a host organization having a processor and memory therein, the instructions cause the system to perform operations comprising:
maintaining production data within a production database within the system of the host organization;
initiating a test sequence against the production database within the system of the host organization, wherein the test sequence specifies:
a) new data for insertion into the production database during the test sequence, and
b) one or more queries limited only to the new data for execution against the production database during the test sequence, wherein the one or more queries cause a lock on data elements of the new data as specified by the one or more queries within the production database which in turn will trigger a data access failure for other production transactions requesting access to the locked data elements of the new data;
inserting the new data into the production database;
recording one or more row IDs corresponding to the inserted new data;
injecting a test context filter into the one or more queries based on the one or more row IDs; and
executing the one or more queries having the test context filter injected therein against the production database, wherein the scope of the one or more queries is restricted to only the new data inserted into the production database during the test sequence via the test context filter preventing the new data introduced into to the production database during the test sequence from being discoverable to the production transactions due to the new data being associated with the test context and not a production context.

18. The non-transitory computer readable storage medium of claim 17:
wherein a first plurality of elements stored within the production database associated with the test context are queryable within the scope of the one or more queries of the test sequence; and
wherein a second plurality of elements stored within the production database which are not associated with the test context are filtered out of the scope of the one or more queries of the test sequence via the test context filter injected into the one or more queries.

19. The non-transitory computer readable storage medium of claim 17:
wherein inserting the new data into the production database comprises inserting the new data into the production database without committing the new data to the production database; and
wherein the operations further comprise executing a roll-back operation against the production database for the new data inserted into the production database during the test sequence, the roll-back operation initiated responsive to the test sequence terminating.

20. A system having a processor and memory therein, comprising:
the processor to execute instructions;
a production database to maintain production data;
a request interface to receive a test sequence from a client device wherein the test sequence specifies:
a) new data for insertion into the production database during the test sequence, and
b) one or more queries limited only to the new data for execution against the production database during the test sequence, wherein the one or more queries cause a lock on data elements of the new data as specified by the one or more queries within the production database which in turn will trigger a data access failure for other production transactions requesting access to the locked data elements of the new data;
a Transaction Entity Object Observer to associate the new data with a test context by recording one or more row IDs corresponding to the inserted new data;
a query interface to insert the new data into the production database;
a query optimizer to inject a test context filter into the one or more queries based on the one or more row IDs; and
the query interface to execute the one or more queries having the test context filter injected therein against the production database, wherein the scope of the one or more queries is restricted to only the new data inserted into the production database during the test sequence via the test context filter preventing the new data introduced into to the production database during the test sequence from being discoverable to the production transactions due to the new data being associated with the test context and not a production context.

21. The system of claim 20, further comprising:

a web-server to implement the request interface to receive the test sequence from the client device;

a multi-tenant database system to implement the production database; and wherein test sequence is to be received at the system as one of a plurality of requests received from a plurality of customer organizations, each customer organization being an entity selected from the group consisting of: a separate and distinct remote organization, an organizational group within the host organization, a business partner of the host organization, or a customer organization that subscribes to cloud computing services provided by the host organization.

* * * * *